US010724622B2

(12) United States Patent
Vuksa

(10) Patent No.: US 10,724,622 B2
(45) Date of Patent: Jul. 28, 2020

(54) NARROW PACKAGING LOCKING DIFFERENTIAL

(71) Applicant: TEAM Industries, Inc., Bagley, MN (US)

(72) Inventor: Zoran Vuksa, Grand Forks, ND (US)

(73) Assignee: TEAM Industries, Inc., Bagley, MN (US)

(*) Notice: Subject to any disclaimer, the term of this patent is extended or adjusted under 35 U.S.C. 154(b) by 2 days.

(21) Appl. No.: 15/794,963

(22) Filed: Oct. 26, 2017

(65) Prior Publication Data
US 2018/0119792 A1 May 3, 2018

Related U.S. Application Data

(60) Provisional application No. 62/413,701, filed on Oct. 27, 2016.

(51) Int. Cl.
F16H 57/037 (2012.01)
F16H 57/02 (2012.01)
(Continued)

(52) U.S. Cl.
CPC ............ F16H 57/037 (2013.01); F16H 1/12 (2013.01); F16H 57/02004 (2013.01); F16H 57/12 (2013.01)

(58) Field of Classification Search
CPC .. F16H 57/037; F16H 57/02004; F16H 57/12; F16H 1/12; F16H 48/20; F16H 48/24; F16H 48/142; F16H 48/30
(Continued)

(56) References Cited

U.S. PATENT DOCUMENTS 1,427,612 A * 8/1922 Marcy ..................... F16H 48/08
33/17 R
1,447,116 A * 2/1923 Baird ..................... F16H 48/08
475/237
(Continued)

FOREIGN PATENT DOCUMENTS

DE 102013109835 A1 3/2015
GB 256112 A * 8/1926 ............. F16H 48/08
(Continued)

OTHER PUBLICATIONS

International Searching Authority, "International Search Report and Written Opinion from PCT Application No. PCT/US2019/029433 dated Jul. 25, 2019", from Foreign Counterpart to U.S. Appl. No. 16/396,169, pp. 1-18, Published: WO.

Primary Examiner — Jake Cook
Assistant Examiner — T. Scott Fix
(74) Attorney, Agent, or Firm — Fogg & Powers LLC

(57) ABSTRACT

A locking system for a narrow package differential with a locking collar, a ring gear and a side output gear is provided. The locking collar has at least one locking tab. The ring gear has at least one ring gear slot and an opening section in each ring gear slot. The at least one ring gear slot receives the at least one locking tab of the locking collar. The side output gear has at least one side gear slot. The side output gear is positioned such that the at least one side gear slot can be accessed through the opening section in the ring gear slot. The at least one locking tab of the locking collar in the ring gear slot is selectively received within the side output gear slot to selectively place the differential in a locking configuration.

21 Claims, 20 Drawing Sheets

(51) Int. Cl.
*F16H 1/12* (2006.01)
*F16H 57/12* (2006.01)

(58) Field of Classification Search
USPC .......................................................... 74/745
See application file for complete search history.

(56) References Cited

U.S. PATENT DOCUMENTS

| | | | | |
|---|---|---|---|---|
| 1,462,879 | A * | 7/1923 | Woodward | F16D 11/10 192/20 |
| 1,515,916 | A * | 11/1924 | Woodward | F16D 41/22 475/241 |
| 1,723,901 | A * | 8/1929 | Todd | F16H 48/08 475/237 |
| 2,121,254 | A * | 6/1938 | Meinke | F16H 48/08 475/237 |
| 4,719,817 | A * | 1/1988 | Azuma | F16H 48/08 475/235 |
| 5,562,561 | A * | 10/1996 | Gillard | F16H 48/08 475/231 |
| 6,394,927 | B1 | 5/2002 | Bongard | |
| 6,432,020 | B1 * | 8/2002 | Rivera | F16H 48/08 475/231 |
| 7,264,569 | B2 | 9/2007 | Fox | |
| 8,911,322 | B2 | 12/2014 | McMillan et al. | |
| 9,212,704 | B2 | 12/2015 | Andonian et al. | |
| 2012/0244987 | A1 | 9/2012 | Haugeberg | |
| 2014/0110211 | A1 | 4/2014 | Andonian et al. | |
| 2015/0107933 | A1 | 4/2015 | Gopal et al. | |

FOREIGN PATENT DOCUMENTS

| | | |
|---|---|---|
| WO | 2016023083 A1 | 2/2016 |
| WO | 2017027594 A1 | 2/2017 |
| WO | 2017083821 A1 | 5/2017 |

* cited by examiner

NARROW PACKAGING LOCKING DIFFERENTIAL

CROSS-REFERENCE TO RELATED APPLICATIONS

This Application claims priority to U.S. Provisional Application Ser. No. 62/413,701, same title herewith, filed on Oct. 27, 2016 which is incorporated in its entirety herein by reference.

BACKGROUND

A differential is a gear train that rotationally connects three shafts to transfer rotational motion. For example, the three shafts may include a drive shaft which is typical coupled to a transmission and pair of wheel drive shafts. A typical property of a differential is that the angular velocity of one shaft is the average of the angular velocities of the others, or a fixed multiple of that average. Moreover a differential may allow an outer wheel shaft drive to rotate faster than the inner drive wheel during a turn. A locking differential is a variation of a standard differential. A locking differential is designed to selectively "lock" rotation of two of the shafts of the differential together as if on a common shaft. This causes wheels coupled to the respective shafts to turn in unison regardless of the traction (or the lack thereof) available to either wheel individually. As vehicles are designed to weigh less and become more compact, it is desirable to reduce the size of all components including the differential.

For the reasons stated above and for other reasons stated below which will become apparent to those skilled in the art upon reading and understanding the present specification, there is a need in the art for a differential with narrowing packaging.

SUMMARY

The following summary is made by way of example and not by way of limitation. It is merely provided to aid the reader in understanding some of the aspects of the subject matter described. Embodiments provide a differential arrangement with an effective and efficient compact locking feature that reduces an overall packaging of the differential.

In one embodiment, a locking system for a narrow package differential is provided. The locking system includes a locking collar, a ring gear and a side output gear. The locking collar has at least one locking tab that radially protrudes from an inner pilot diameter surface of a collar portion of the locking collar. The ring gear has at least one ring gear slot. The at least one ring gear slot is configured to receive the at least one locking tab of the locking collar. The ring gear has an opening section in the at least one ring gear slot. The side output gear has at least one side gear slot. The side output gear is positioned such that the at least one side gear slot can be accessed through the opening section of the at least one ring gear slot of the at least one ring gear. The at least one locking tab of the locking collar in the at least one ring gear slot is selectively received within the at least one side output gear slot to selectively place the differential in a locking configuration.

In another embodiment, a differential is provided. The differential includes a differential including a housing, a torque receiving assembly, a ring gear assembly, a differential pinion assembly, a first side output gear, a second side output gear and a locking system. The housing has an input passage, a first output passage and second output passage. The torque receiving assembly is received at least in part within the input passage of the housing. The ring gear assembly is received within the housing. The ring gear assembly is in rotational communication with the torque receiving assembly. The differential pinion assembly is also received within the housing. The differential pinion assembly is in rotational communication with the ring gear assembly. The differential pinion assembly includes a first pinion gear and a second pinion gear. The second pinion gear is configured and arranged to rotate independently from the first pinion gear. The first side output gear is received within the housing. The first side output gear is in rotational communication with the first and second pinion gears. The first output passage of the housing proving access to the first side output gear. The second side output gear is further received within the housing. The second side output gear is in rotational communication with the first and second pinion gears. The second output passage of the housing provides access to the second side output gear. The locking system includes a locking collar. The locking collar has at least one locking tab that radially protrudes from an inner pilot diameter surface of a collar portion of the locking collar in an inverted star orientation. The ring gear has at least one ring gear slot. The at least one ring gear slot is configured to receive the at least one locking tab of the locking collar. The ring gear further has an opening section in the at least one ring gear slot. The first side output gear has at least one side gear slot. The first side output gear is positioned such that the at least one side gear slot can be accessed through the opening section of the at least one ring gear slot of the ring gear. The at least one locking tab of the locking collar in the at least one ring gear slot is selectively received within the at least one side gear slot to place the differential in a locking configuration.

In another embodiment, a vehicle is provided. The vehicle includes a motor, a transmission, at least one drive shaft, at least one differential a first drive axle and a second drive axle. The motor provide a motor torque. The transmission is configured and arranged to receive the motor torque from the motor. The transmission is configured and arranged to applying select gear ratios to the received motor torque from the motor to generate a desired transmission output torque. The least one drive shaft is coupled to receive the transmission output torque. The least one differential, includes a torque receiving assembly, a ring gear, a differential pinion assembly, a first side output gear, a second output gear, a locking system, a first drive axle and a second drive axle. The torque receiving assembly is in rotational communication with the at least one drive shaft. The ring gear is in rotational communication with the torque receiving assembly. The differential pinion assembly is in rotational communication with the ring gear. The differential pinion assembly includes a first pinion gear and a second pinion gear. The second pinion gear is configured and arranged to rotate independently from the first pinion gear. The first side output gear is in rotational communication with the first and second pinion gears. The second side output gear is also in rotational communication with the first and second pinion gears. The locking system includes a locking collar. The locking collar has at least one locking tab that radially protrudes from an inner pilot diameter surface of a collar portion of the locking collar in an inverted star orientation. The ring gear has at least one ring gear slot. The at least one ring gear slot is configured to receive the at least one locking tab of the locking collar. The ring gear has an opening section in the at least one ring gear slot. The first side output gear has at least one side gear slot. The first side output gear is positioned such that the at least one side gear slot can be accessed through the opening section of the at least one ring gear slot of the at least one ring gear. The at least one locking tab of the locking collar in the at least one ring gear slot is selectively received within the at least one side gear slot to place the differential in a locking configuration. The first drive axle is in rotational communication with the first side output gear. The first drive axle further configured to be coupled to a first wheel. The second drive axle in rotational communication with the second side output gear. The second drive axle further configured to be coupled to a second wheel.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
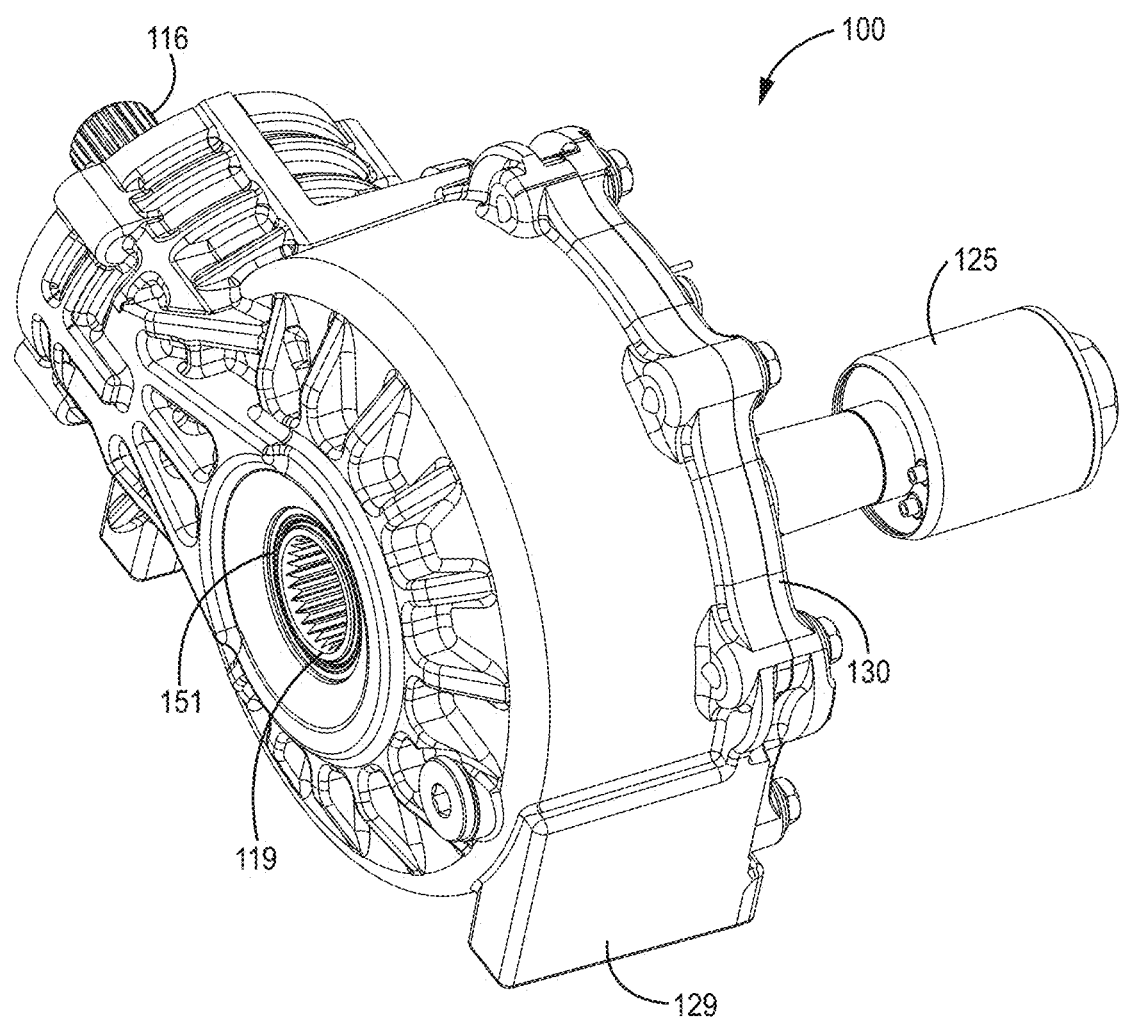
FIG. 1 is a first side perspective view of a narrow package differential of an exemplary embodiment.
Figure 2:
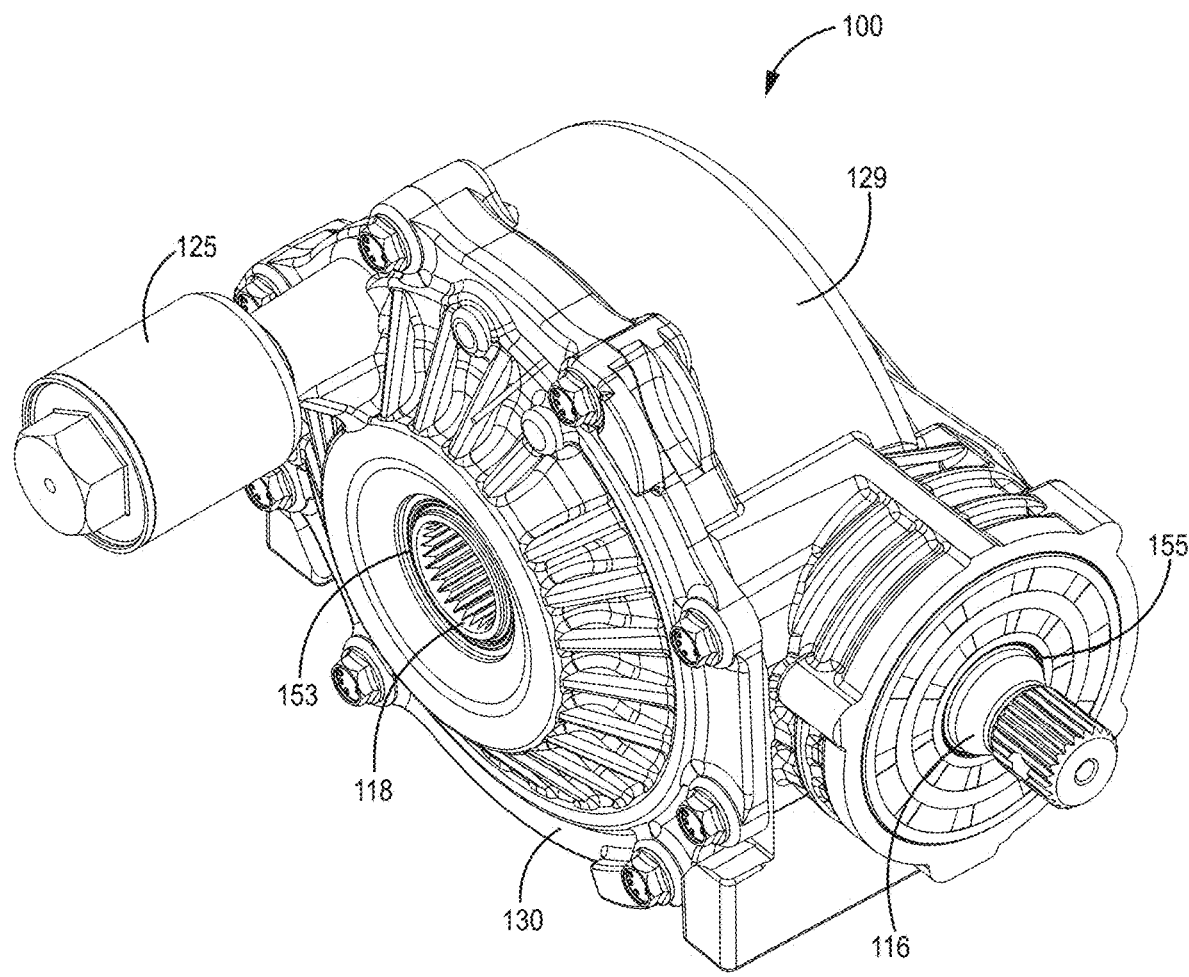
FIG. 2 is a second side perspective view of the narrow package differential of FIG. 1.

Embodiments of the present invention include a locking system 200 that allows for a narrow package differential 100. FIG. 1 illustrates the first side view of a narrow package differential 100 and FIG. 2 illustrates a second side view of the narrow package differential 100. Having a narrow packaging has certain gains such a being lighter and allowing more suspension travel, etc. The narrow package differential 100 includes a housing having a first housing portion 129 and a second housing portion 130. As illustrated in FIG. 1, the first housing portion 129 has a first output passage 151 to a second side gear 119. As illustrated in FIG. 2, the second housing portion 130 has a second output passage 153 to a first side gear 118. Also illustrated in FIG. 1 is an end portion of a spiral bevel pinon gear assembly 116 extending through an input passage 155 of the housing and an actuator 125 that is configured to selectively lock the differential as described in detail below.

Figure 3:
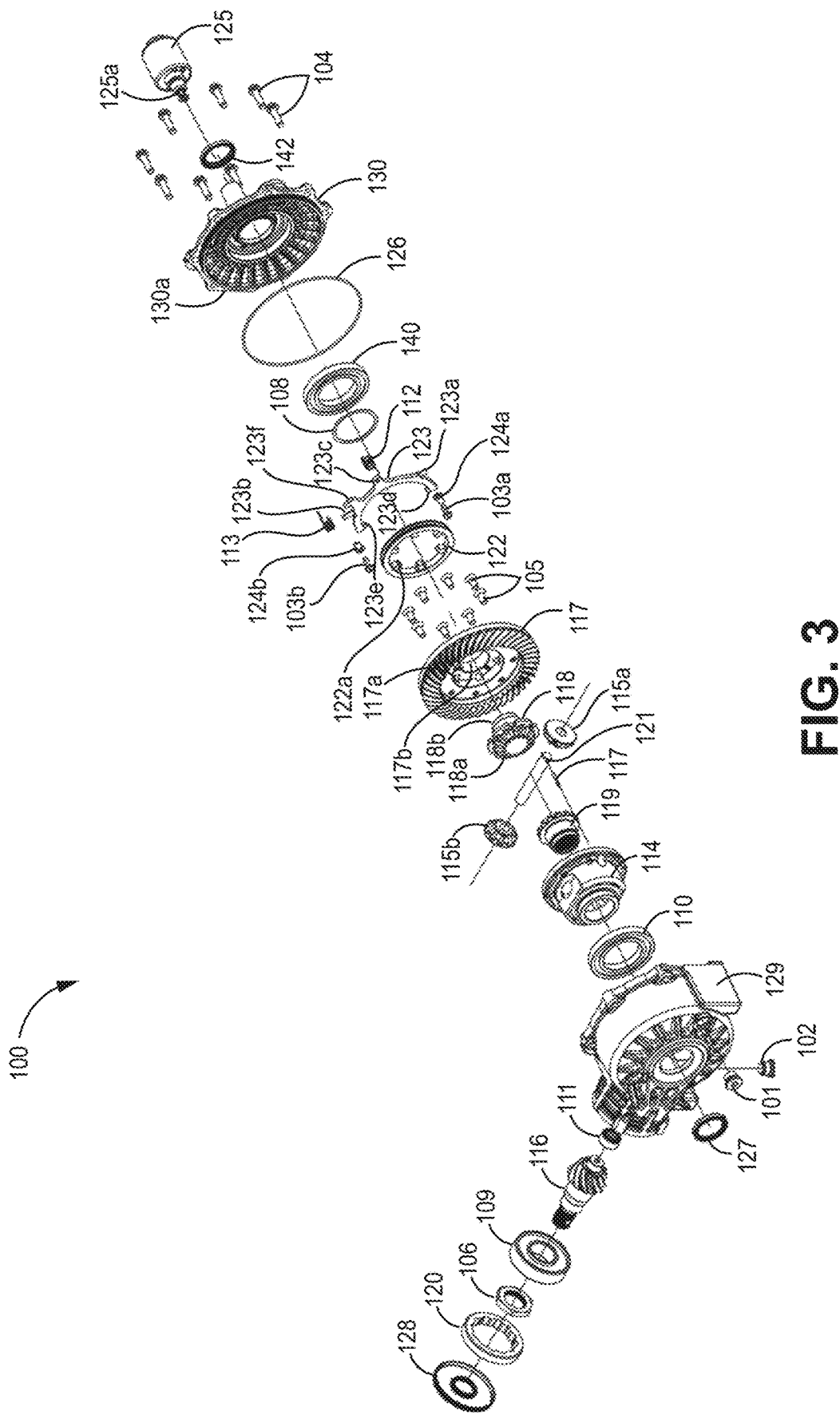
FIG. 3 is an exploded side perspective view of the narrow package differential of FIG. 1.

FIG. 3 illustrates and exploded view of the narrow package differential 100. Accessed through the input passage 155 of housing portion 129 is a torque receiving assembly that is typically coupled to the receive torque from a transmission via drive shaft or the like. The torque receiving assembly includes the spiral bevel pinion assembly shaft 116, a needle bearing 111, ball bearing 109, bearing nut 106, lock nut 120 and seal 128. Also engaging the first housing portion 129 is a seal 127 to retain differential fluid within the housing and plugs 101 and 102 to allow for the filling and draining of differential fluid.

The narrow package differential 100 further includes a first pinion gear 115a mounted on a first end of a differential rod 121 via dowel pin 117 and a second pinion gear 115b that is rotationally mounted on a second end of the differential rod 121. The first side gear 118 has a first set of teeth that engage teeth on both of the first pinion gear 115a and the second pinion gear 115b. The second side gear 119 has a second set of teeth that also engage the teeth on the first pinion gear 115a and the second pinion gear 115b. A ball bearing 110 is positioned within the first housing portion 129 about a seat portion of a carrier 114. The carrier 114 is coupled to a ring gear 117 via fasteners 105.

Figure 4:
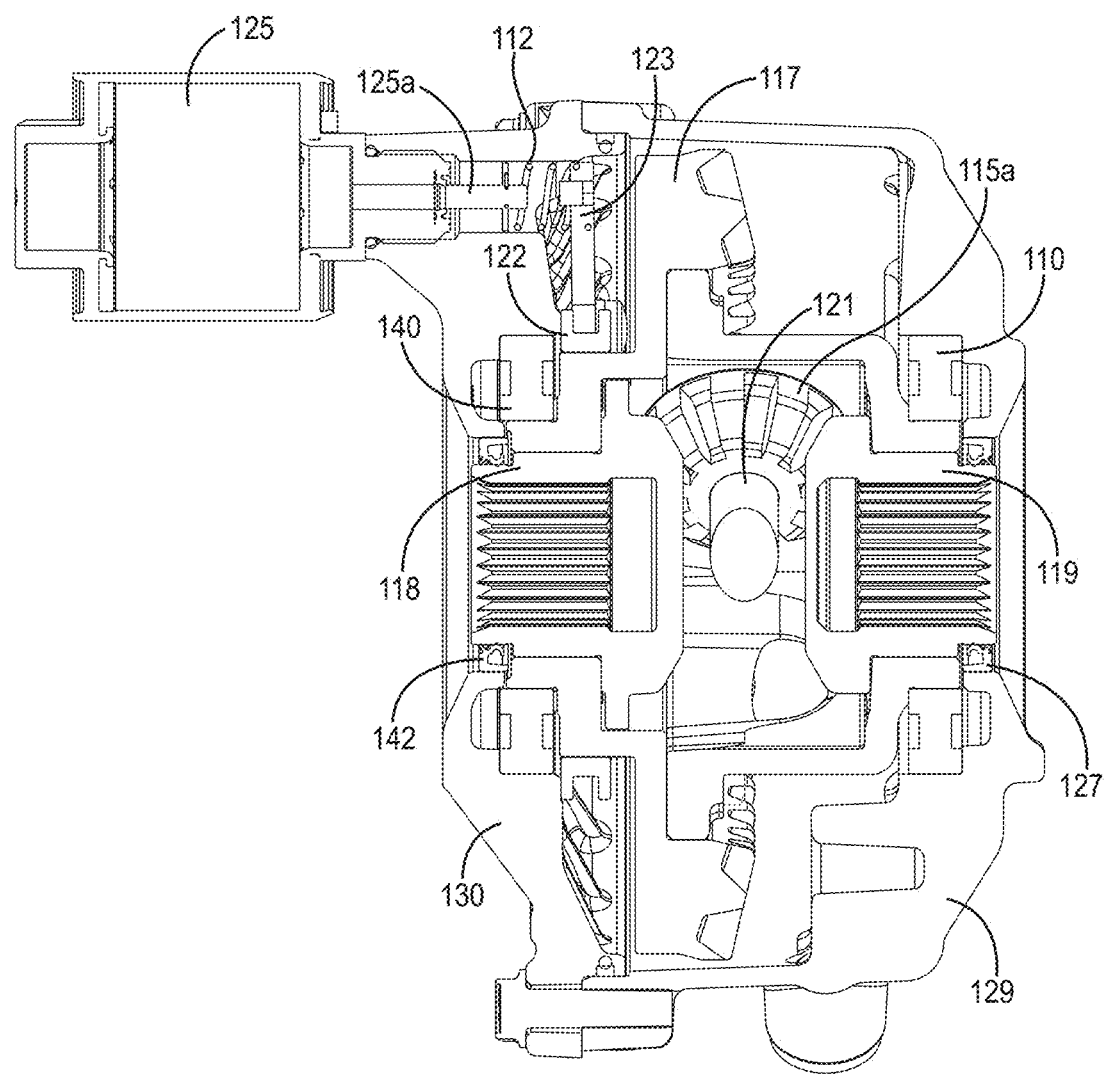
FIG. 4 is a cross-sectional side view of the narrow package differential of FIG. 1.

The narrow package differential 100 of the example embodiment also includes a locking collar 122, a lock fork 123, a shim 108, bearing 140, O-ring 126 and seal 142. The first housing portion 129 is coupled to the second housing portion 130 via fasteners 104. The narrow package differential 100 further includes an actuator 125. The actuator 125 is coupled to manipulate the lock fork 123. The lock fork 123 is positioned to manipulate the lock ring 122 as further discussed in detail below. First and second bias members 112 and 113 are used to bias the lock fork 123 and the lock collar 122 in select positions. This is further discussed in detail below. The locking system includes the first side gear 118, the ring gear 117, the locking collar 122, the lock fork 123, the first and second bias members 112 and 113 and actuator 125. A cross sectional illustration of an assembled narrow package differential 100 of an embodiment is illustrated in FIG. 4. The sizing of the components are made only for conveying packaging comparison.

Figure 5A:
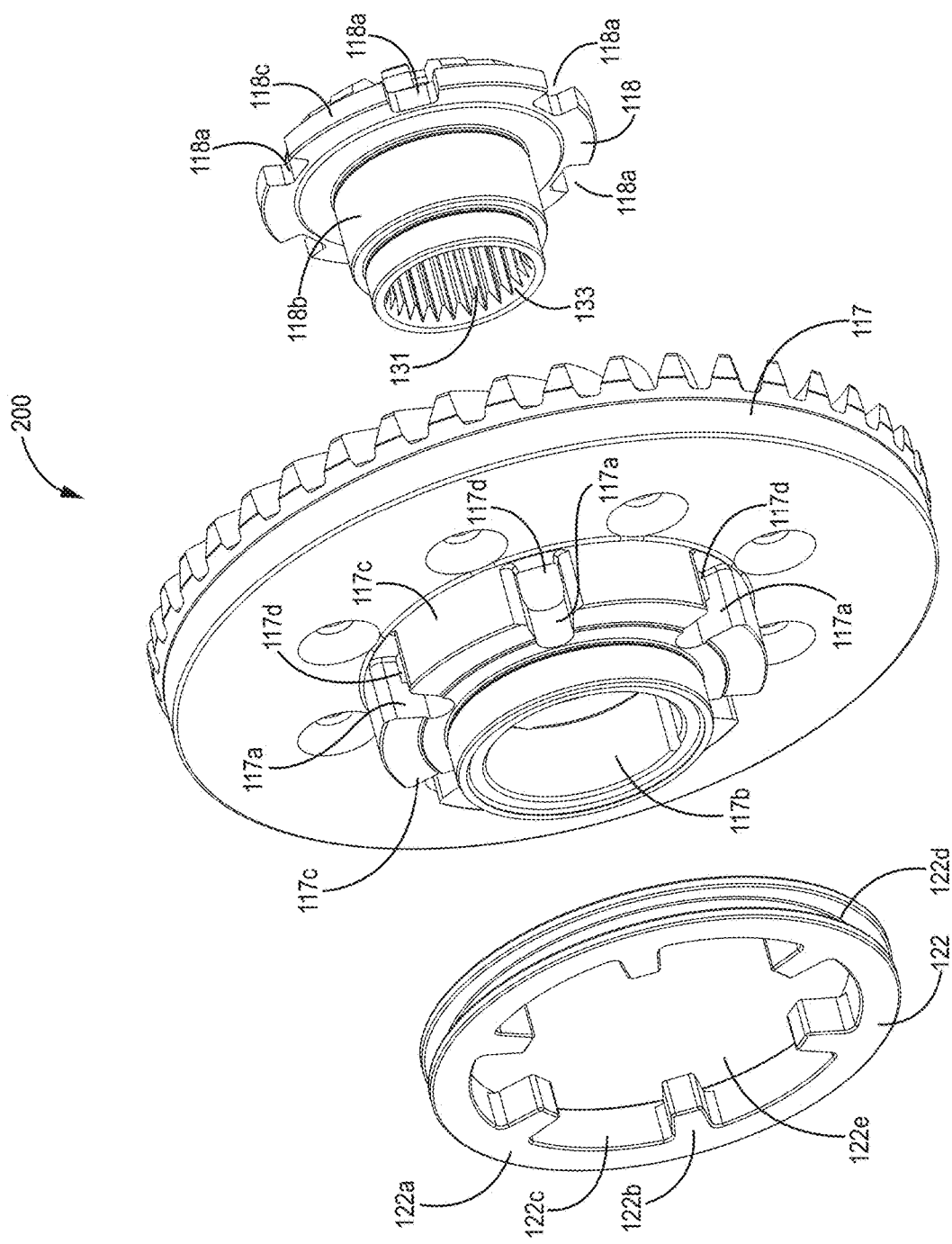
FIG. 5A is a first perspective side view of a partial locking system of an exemplary embodiment.
Figure 5B:
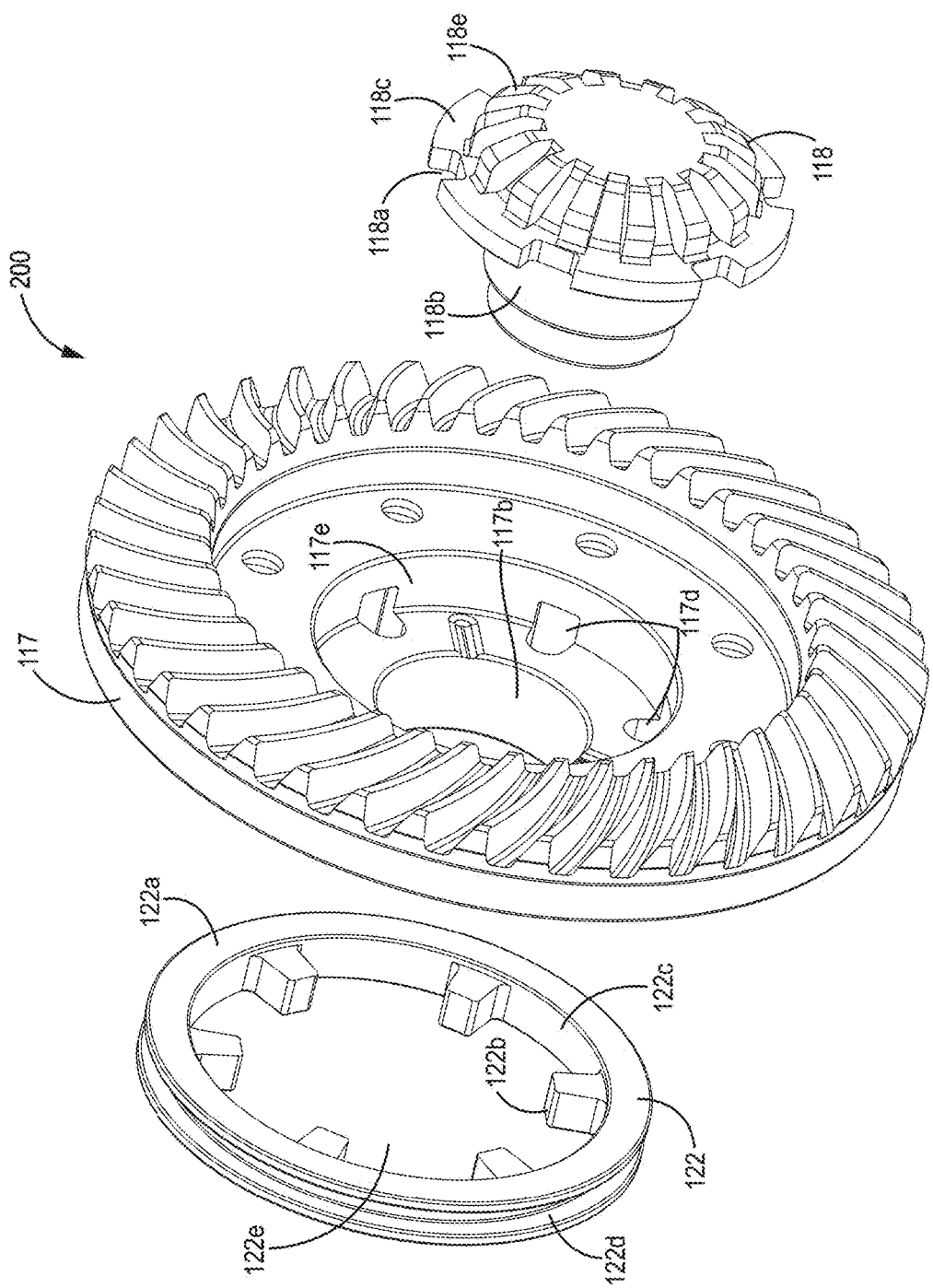
FIG. 5B is a second perspective side view of the partial locking system of FIG. 5A.

A portion of the locking system 200 is illustrated in FIGS. 5A and 5B. In particular, FIG. 5A illustrates a first side view of the partial locking system 200 from a first perspective and FIG. 5B illustrates the first side view from a second perspective. The locking collar 122 of the locking system 200 includes locking features (locking tabs 122b) that radially protrude inward from an inner diameter surface (inner pilot diameter surface 122c) of a collar portion 122a of the locking collar 122 in an inverted star orientation. Pilot diameter surface 122c pilots on an associated outer pilot diameter surface 117c of the ring gear 117. The locking collar 122 further includes a central passage 122e and an outer perimeter manipulation feature 122d which in one embodiment is a groove used by the lock fork 123 to manipulate the position of the lock collar 122 as further discussed below. In another embodiment, the outer perimeter manipulation feature includes a ridge.

As discussed above, the ring gear 117 of this embodiment includes the outer pilot diameter surface 117c on a hub portion 117e that receives the inner pilot diameter surface 122c of the collar portion 122a of the locking collar 122. The hub portion 117e further includes ring gear locking slots 117a that are configured to receive the locking tabs 122b of the locking ring 122. Within each ring gear locking slot 117a is an opening section 117d. The hub portion 117e of the ring gear 117 further includes a central opening 117b.

The side gear 118 includes side gear locking slots 118a that are distributed on an outer rim 118c. A side gear journal 118b of the side gear 118 fits in the central opening 117b of the hub portion 117e of the ring gear 117. The side gear 118 further includes a side gear central passage 131. Within the central passage 131 are splines 133 to couple rotation of the side gear 118 to a drive axle. Further, the side gear 118 includes side gear engaging teeth 118e configured to couple rotation between the side gear 118 and the first and second gears 115a and 115b.

Figure 6A:
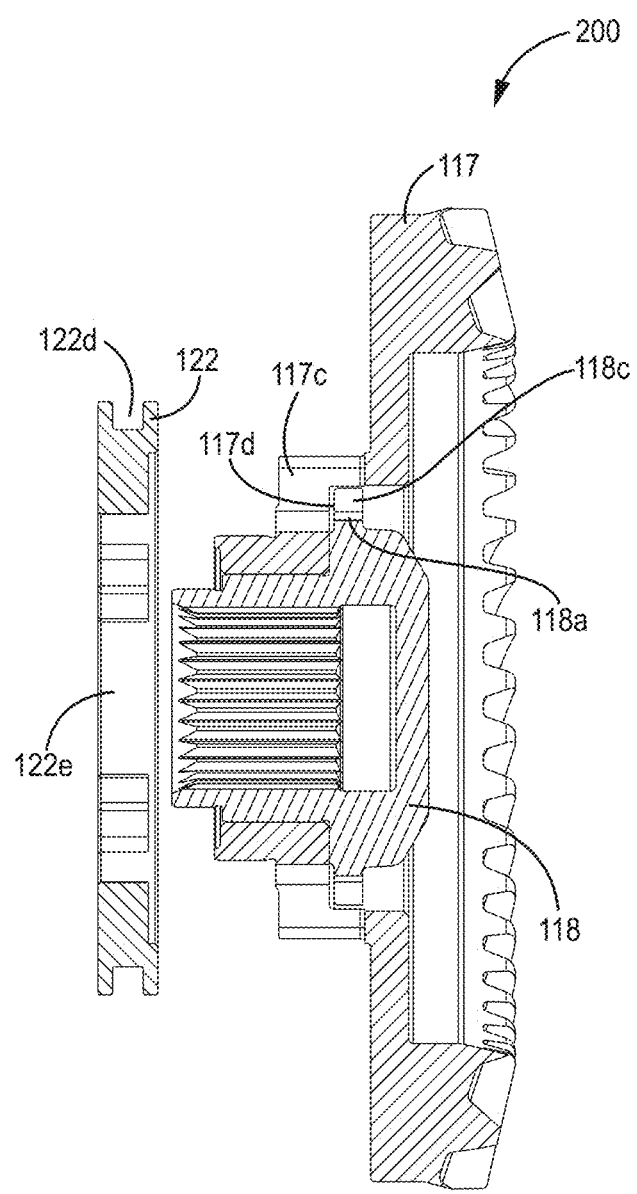
FIG. 6A is a cross-sectional side view of the partial locking system of FIG. 5A partially unassembled.
Figure 6B:
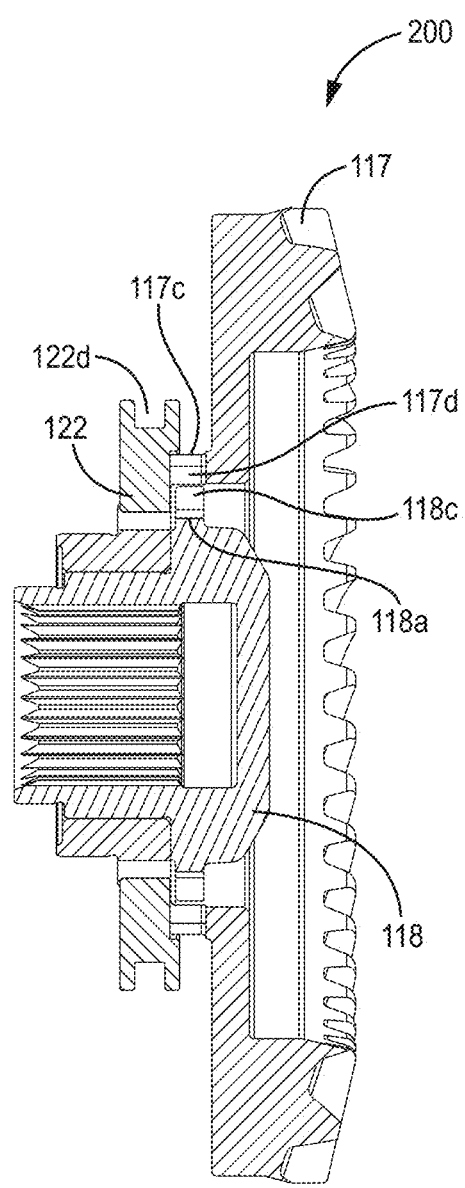
FIG. 6B is a cross-sectional side view of the partial locking system of FIG. 5A assembled with the locking system in an unlocked configuration.
Figure 6C:
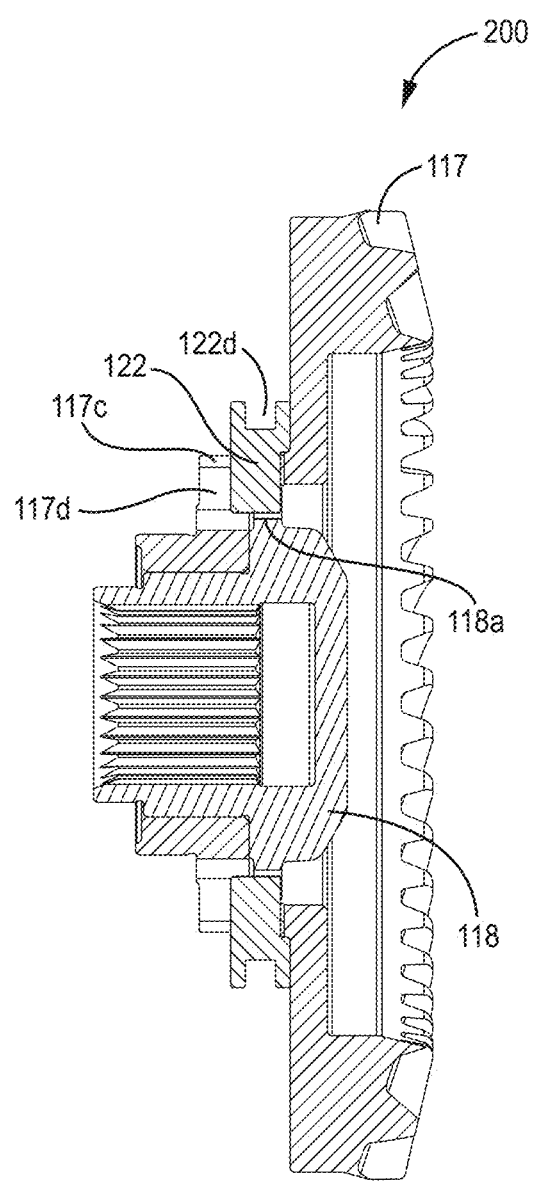
FIG. 6C is a cross-sectional side view of the partial locking system of FIG. 5A assembled with the locking system in a locked configuration.
Figure 7A:
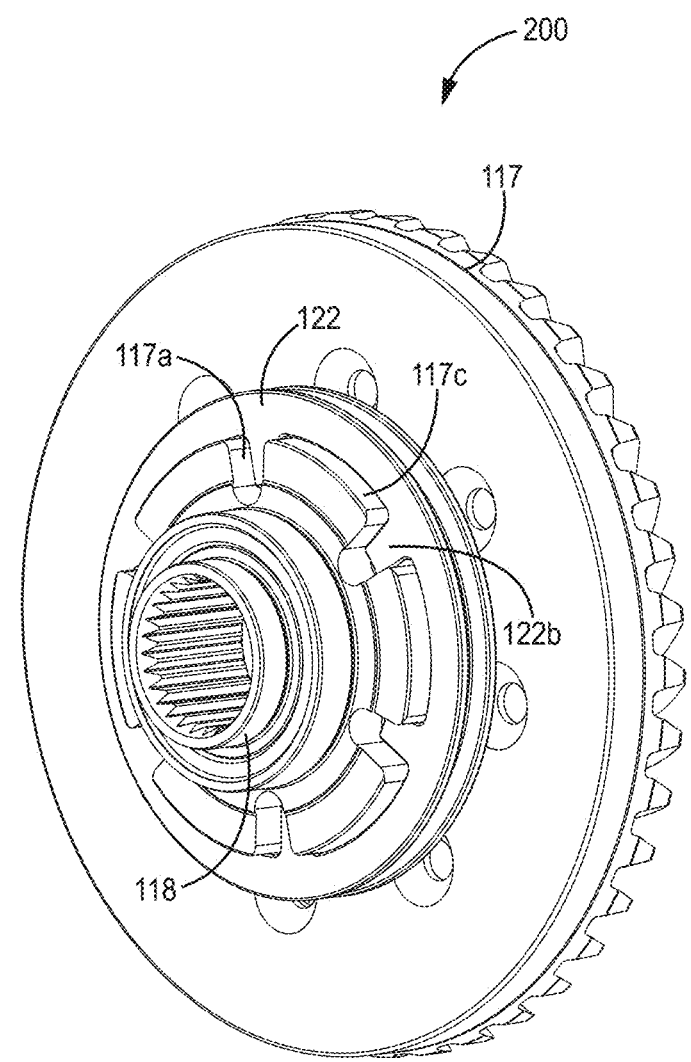
FIG. 7A is a first end view of the partial locking system of FIG. 5A.
Figure 7B:
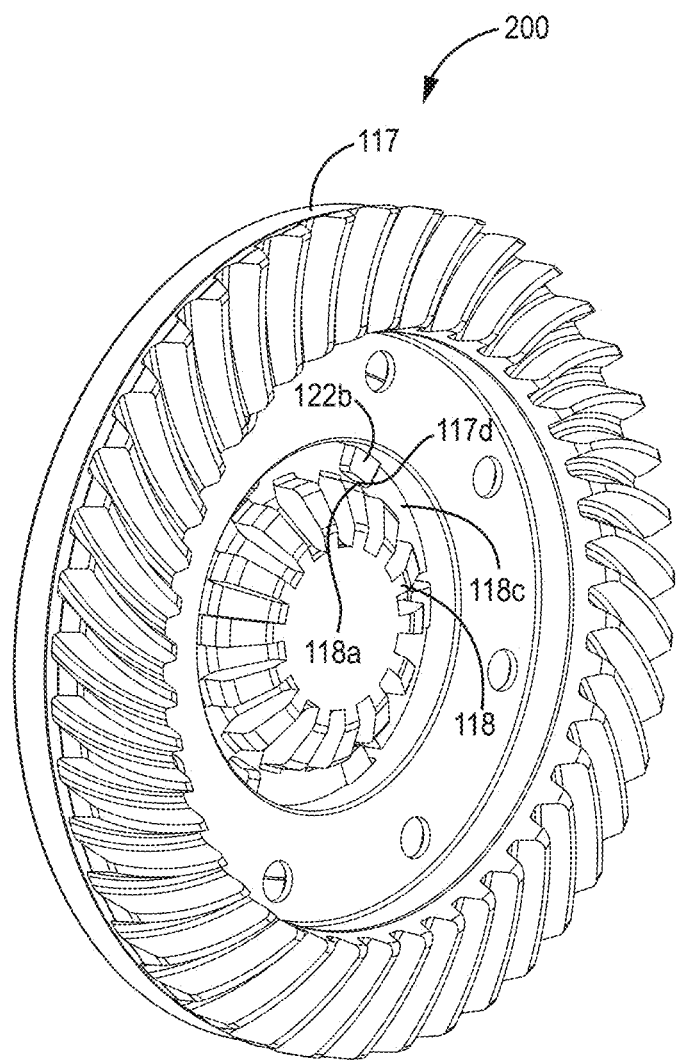
FIG. 7B is a second end view of the partial locking system of FIG. 5A.

Referring to the cross-sectional side view of FIG. 6A, the side gear journal 118b of the side gear 118 is positioned within the central opening 117b of the hub portion 117e of the ring gear 117. Further, the locking collar 122 is aligned to be positioned on the outer pilot diameter surface 117c on a hub portion 117e of the ring gear 117. The cross-sectional side view of FIG. 6B illustrates the locking collar 122 slidably mounted on the hub portion 117e of the ring gear 118. In particular, the pilot diameter surface 122c of the locking collar 122 is illustrated as piloting on the associated outer pilot diameter surface 117c of the ring gear 117. In FIG. 6B the locking tabs 122b of the locking collar 122 are positioned away from the side gear locking slots 118a of the ring gear 118. The cross-sectional side view of FIG. 6C illustrates the locking collar 122 positioned so that the locking tabs 122b of the locking collar 122 are received in the side gear locking slots 118a of the ring gear 118. This is further illustrated in the first perspective side view of FIG. 7A and the second perspective side view of FIG. 7B.

As discussed above, in embodiments, the locking tabs 122b of locking collar 122 are selectively received within ring gear locking slots 117a of the ring gear 117 while the inner pilot diameter surface 122c slidably engages the outer pilot diameter surface 117c of the ring gear 117. In particular, the outer pilot diameter surface 117c of the hub portion 117e of the ring gear 117 is arranged to allow the locking collar 122 to pilot slide on it via the inner pilot diameter surface 122c of the locking collar 122 in and out of a lock position. That is, the locking collar 122 slides in relation to the ring gear 117 via the outer pilot diameter surface 117c of the ring gear 117 and the inner pilot diameter surface 122c of the locking collar 122 therein causing the locking tabs 122b of the locking collar 122 to nest in and engage locking features 118a of the side gear 118 via the opening sections 117d in the locking slots 117a of the ring gear 117. The locking tabs 122b of the locking collar 122, via the opening sections 117d of the ring gear 117, are received within side gear locking slots 118a of the side gear 118 to selectively lock the ring gear 117 and the side gear 118 together. Hence, in embodiments, the locking collar 122, the ring gear 117 and side gear 118 are selectively locked together, via the locking collar locking tabs 122b being received within the ring gear locking slots 117a and the side gear slots 118a of the ring gear 17. This configuration allows for a fully lockable differential with narrow packaging.

In operation, the side gear journal 118b of the side gear 118 fits in the central opening 117b of the ring gear 17 as discussed above. The side gear 118 rotates within the central opening 117b of the ring gear 117 during a differential operation function of the differential 200. If it is desired to lock the differential 100 (prevent the rotation of the side gear 118 within the ring gear 117, the locking collar 22 (inverted star) is moved axially until the lock features (the locking tabs 122b), received within the ring gear locking slots 117a of the ring gear 117, slide into the side gear locking slots 118a (locking features) of the side gear 118. The alignment and engagement of all 3 locking features (the locking tabs 122b of the locking collar 122, the ring gear slots 117a of the ring gear 117 and the side gear locking slots 118a of the side gear 118) cause the differential 100 to lock and stay locked until the locking collar 122 (inverted star) is axially slid away from the side gear locking slots 118a of the side gear 118. In some embodiments, the locking tabs 122a of the locking collar 122 remain within the ring gear locking slots 117a of the ring gear 117 when the locking tabs 122a are removed from the side gear locking slots 118a of the side gear 118. In particular, the locking collar 122, in an embodiment, slides via the inner diameter surface 122c on a pilot diameter surface 117c of the ring gear 117, as well the locking tabs 122a sliding in respective ring gear locking slots 117a. These features are always engaged, and the locking tabs 122a of the sliding collar 122 in or out from the side gear locking slots 118a of side gear 118 cause the differential 100 to be either in a locked gear configuration or an unlocked gear configuration.

The position of the locking collar 122 is controlled via lock fork 123 which, in one embodiment, is pivotally mounted to the second housing cover 130. The lock fork 123 is best illustrated in FIG. 3. The lock fork 123 includes generally a U-shaped body with opposably positioned pivot posts 123a and 123b. The lock fork 123 further includes fork tabs 123e and 123d positioned proximate ends of the U-shaped body extending inward towards each other. The lock fork 123 also include a central activation portion 123c and a bias member stop arm 123f. The lock fork 123 is allowed to pivot via the pivot posts 123a and 123b. The pivot posts 123a and 123b are received in pivot nests, such as pivot nest 130a of the second housing cover 130. The fork tabs 123d and 123e are received in and engage the outer perimeter manipulation feature 122d of the collar 122 to selectively move the collar 122 in and out of the locked configuration. The second basing member 113 has a first end that engages the bias member stop arm 123f to bias the lock fork 123 in a locked configuration. In other embodiments, a bias member is used to bias to unlock. Moreover, the first biasing member 112, further biases the lock fork 123 to an unlocked configuration. This is best seen in FIG. 4, where the first biasing member 112 is positioned between the central activation portion 123c of the lock fork 123 and a stop of a plunger 125a of the actuator 125.

In the unlocked configuration, the plunger 125a of the actuator 125 pushes on the first bias member which in turn pushes on the central activation portion 123c of the lock fork 123 to position the locking collar 122 in the unlocked configuration. To place the differential 100 into the locked configuration in an embodiment, the plunger 125a retracts into the actuator 125 therein releasing the bias force of the first bias member 112. This allows the bias force of second bias member 112 to position the lock collar 122 in locked configuration.

Figure 8A:
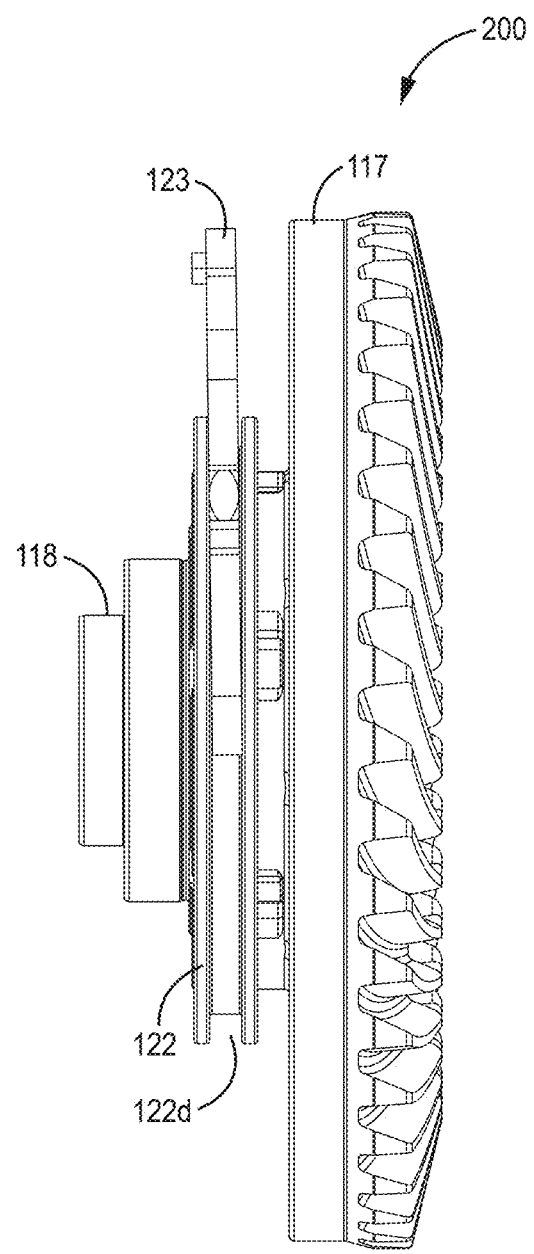
FIG. 8A is a side view of a partial locking system including a lock fork of an exemplary embodiment with the locking system in an unlocked configuration.
Figure 8B:
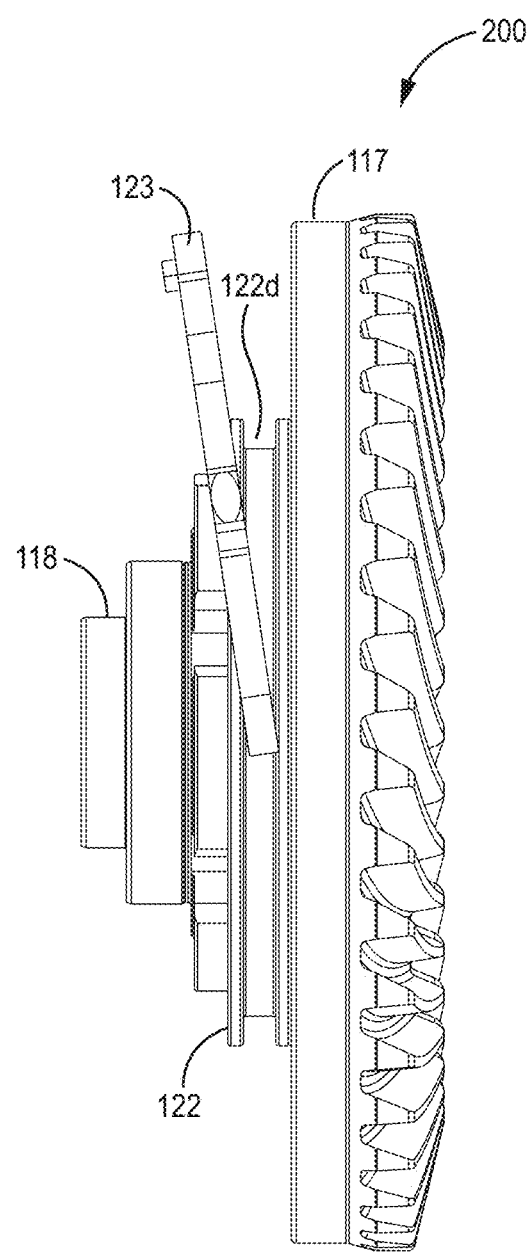
FIG. 8B is a side view of the partial locking system including the lock fork of FIG. 8A with the locking system in a locked configuration.

Referring to FIG. 8A and FIG. 8B, the lock fork 123 and the position of the locking collar 122 in the unlocked and locked configurations are shown. In particular, FIG. 8A illustrates the lock fork 123 and the locking collar 122 in the unlocked configuration and FIG. 8B illustrates the lock fork 123 and locking collar 122 in the locked configuration. As discussed above, in the locked configuration, the locking collar 122 is moved axially until the locking tabs 122b, received within the ring gear locking slots 117a of the ring gear 117, slide into the side gear locking slots 118a of the side gear 118. The alignment and engagement of all 3 locking features (the locking tabs 122b of the locking collar 122, the ring gear slots 117a of the ring gear 117 and the side gear locking slots 118a of the side gear 118) cause the differential 100 to lock and stay locked until the locking collar 122 is axially slid away from the side gear locking slots 118a of the side gear 118 as illustrated in FIG. 8B.

Figure 9A:
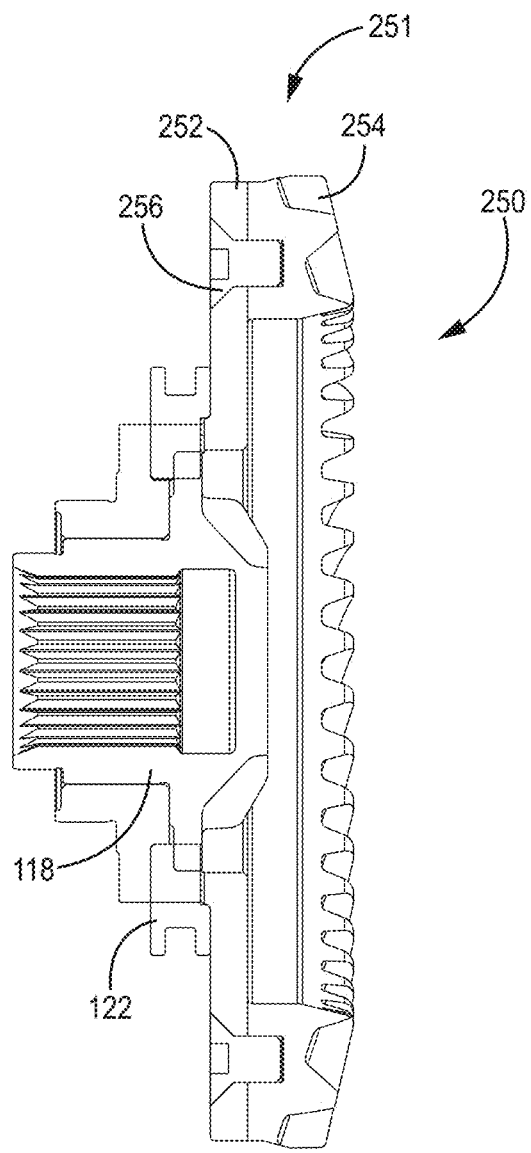
FIG. 9A is a cross-sectional side view of a partial locking system including a ring gear of an exemplary embodiment.

Referring to FIG. 9A, another embodiment of the locking system 250 is illustrated. In this example embodiment, the ring gear 251 includes a ring gear base 252 and a gear portion 254. The gear portion 254 is coupled to the ring gear base 252 via fasteners 256. Hence, in this example, embodiment the ring gear 251 is formed by two different pieces coupled by fasteners.

Figure 9B:
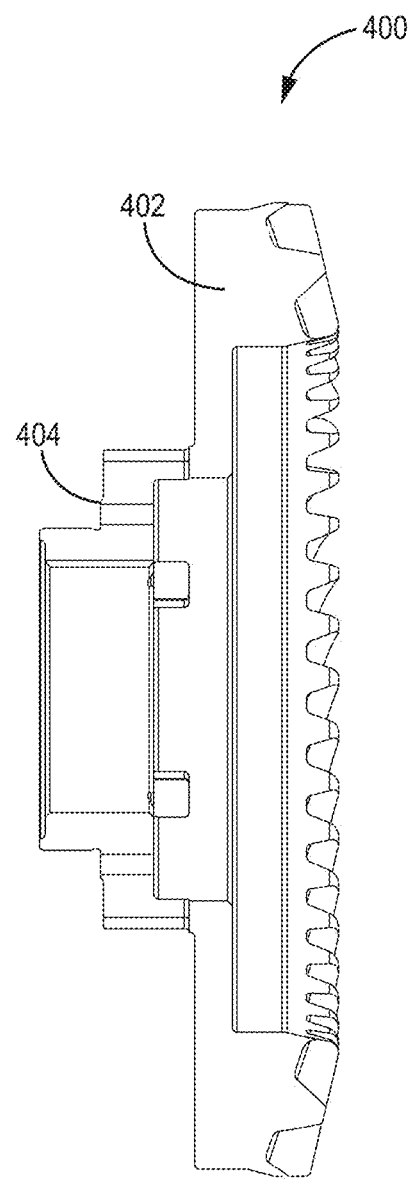
FIG. 9B is a cross-sectional side view of a ring gear of an exemplary embodiment.
Figure 9C:
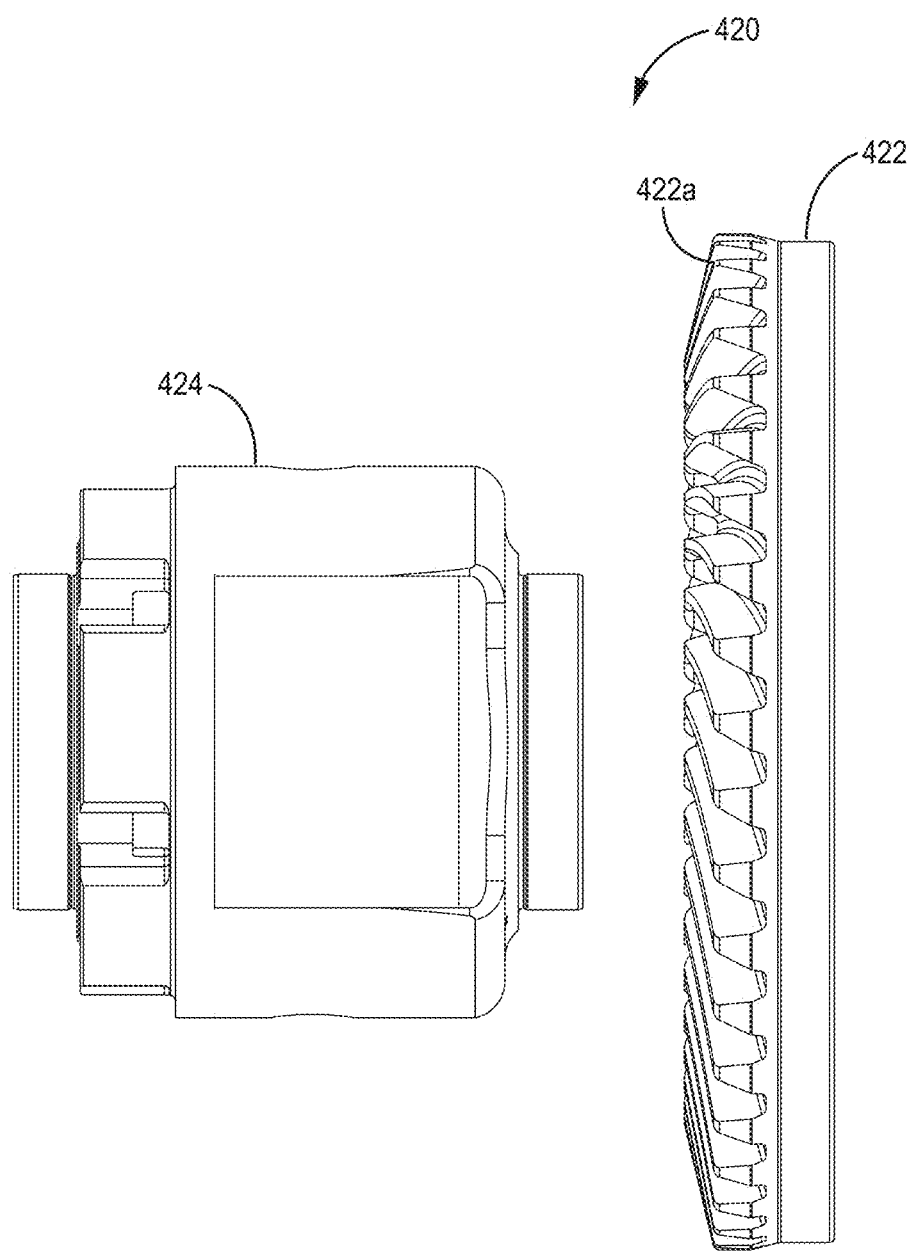
FIG. 9C is a side view of a ring gear of another exemplary embodiment.
Figure 9D:
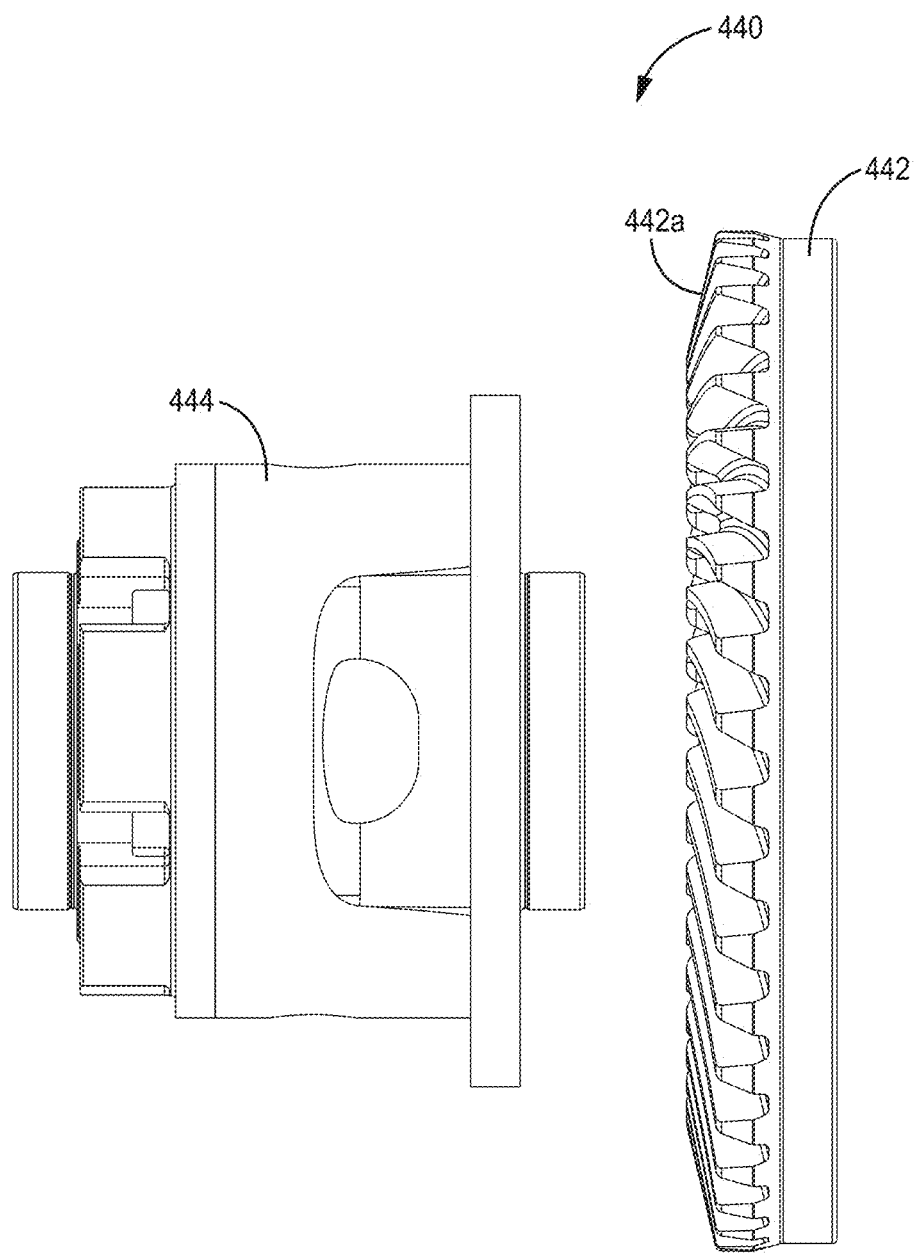
FIG. 9D is a side view of a ring gear of yet another exemplary embodiment.
Figure 9E:
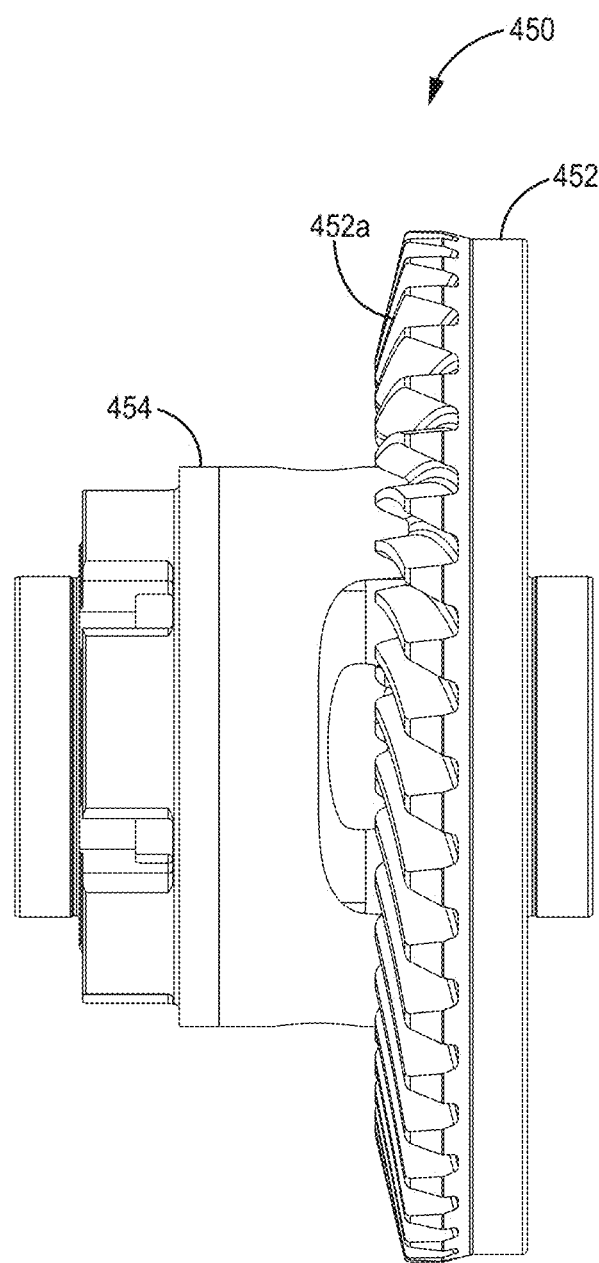
FIG. 9E is a side view of a ring gear of still another exemplary embodiment.
Figure 9F:
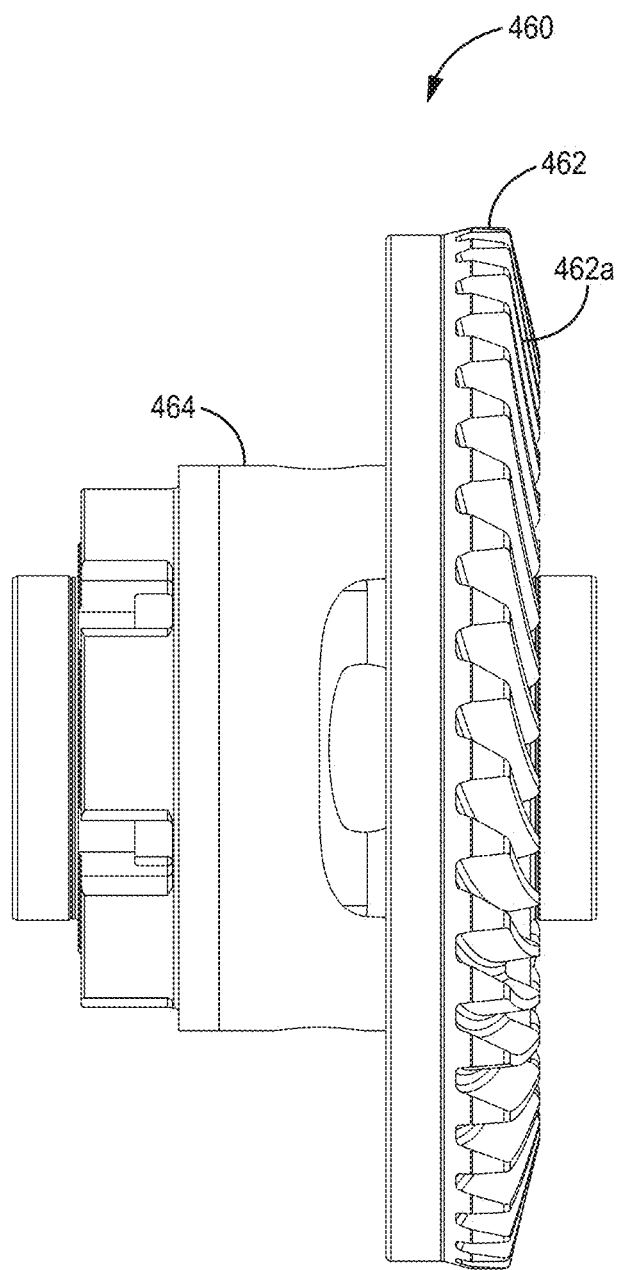
FIG. 9F is a side view of a ring gear of yet still another exemplary embodiment.

FIGS. 9B through 9F further illustrate other embodiments of ring gears. FIG. 9B illustrates a ring gear 400 that includes a gear portion 402 and a carrier portion 404. In this example the ring gear carrier portion may be a single piece construction. FIG. 9C further illustrates a ring gear 420 with a gear portion 402 and a carrier portion 424. The carrier portion 424 in this example is also a single piece construction. Further in this embodiment, the gear portion 422 has a gear side 422a facing in an opposite direction that the embodiment of ring gear 400 of FIG. 9B. In particular, the gear side 422a of the gear portion 422 of the ring gear 420 faces the carrier portion 424 of the ring gear 420. FIG. 9D illustrates a further embodiment of an unassembled a ring gear 440. Ring gear 440 includes a gear portion 442 and a carrier portion 444. The carrier portion 444 in this embodiment may be a two piece construction. A gear side 442a of the gear portion 442 faces the carrier portion 444 in this example embodiment. FIG. 9E illustrates another embodiment of an assembled ring gear 450. Ring gear 450 includes a gear portion 452 and a carrier portion 454. The carrier portion 454 in this embodiment may be a two piece construction. A gear side 452a of the gear portion 452 faces the carrier portion 454 in this example embodiment. FIG. 9F illustrates yet another embodiment of an assembled ring gear 460. Ring gear 460 includes a gear portion 462 and a carrier portion 464. The carrier portion 456 in this embodiment may be a two piece construction. A gear side 462a of the gear portion 462 faces the carrier portion 464 in this example embodiment.

Hence, as illustrated in FIGS. 9A through 9F, the ring gear may have many different configurations that include a carrier portion with one, two or more pieces. In one example embodiment, the ring gear portion and a locking portion (outer ring gear slot and outer pilot diameter surface arrangement) of the carrier portion are made from hardened steel while the rest of the carrier portion is made of cheaper material that may be just bolted on to the hardened steel portion. Further as illustrated in FIGS. 9A through 9F, the gear side of the gear portion of the ring gear can be placed on either side to accommodate any configuration. Further in one embodiment, the gearing portion of the ring gear may be fastened to the ring gear base and the carrier base via fasteners, welding or the like to create a single piece of gear and carrier with all the locking features (slots) that are required for locking in embodiments.

Figure 10:
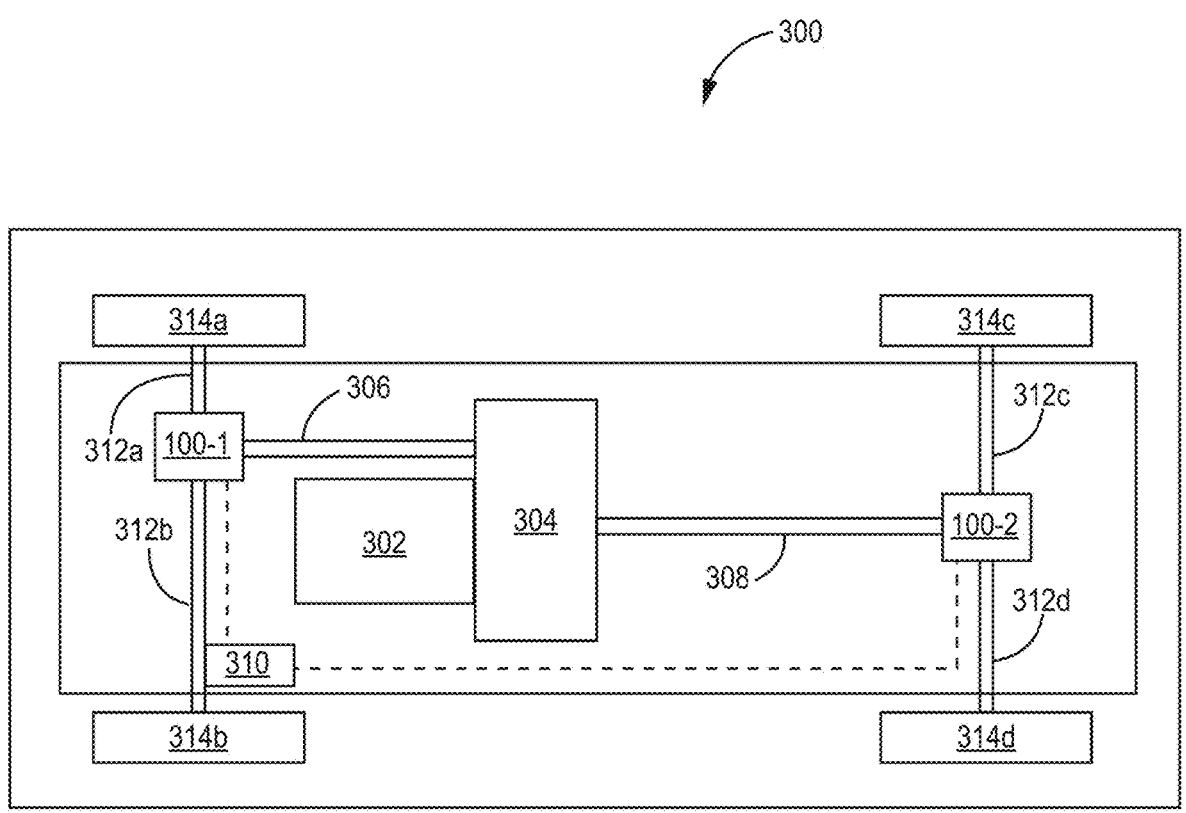
FIG. 10 is a block diagram of a vehicle of an exemplary embodiment.

FIG. 10 is a block diagram of a vehicle 300 of an embodiment that includes narrow package differentials 100-1 and 110-2 as discussed above. Example vehicle 300 further include a motor 302 that provide torque to an input of a transmission 304. In the example, the transmission 304 has two outputs to provide torque to front wheels 314a and 314b and rear wheels 314c and 314d. In particular, a front output of the transmission 304 is coupled to a front drive shaft 306. The front drive shaft 306 in turn is coupled to the torque receiving assembly of differential 100-1. First and second front drive axles 312a and 312b couple differential 100-1 to wheels 314a and 314b. A switch 310 is used to selectively lock differential 100-1. The switch 310 in an embodiment is under control of the operator of the vehicle 300. In another embodiment, the switch 310 may be part of an electronic control unit that activates the switch 310 based at least in part on current conditions the vehicle is experiencing.

The rear output of the transmission 304 is coupled to a rear drive shaft 308. The rear drive shaft 308 in turn is coupled to the torque receiving assembly of differential 100-2. First and second rear drive axles 312c and 312d couple differential 100-2 to wheels 314c and 314d. Switch 310 is also used to selectively lock differential 100-2 in this example embodiment. In another embodiment, a separate switch would be used to selectively lock differential 100-2. As discussed, vehicle 300 is merely one example of a vehicle employing a narrow package differential 100. Other type of vehicles may also be used, including, but not limited to, vehicles that are only two wheel drive. Moreover, in an embodiment, the narrow package differential 100 can be implemented in a transaxle.

Although, bevel gears are illustrated an being used in the differential, other type of gearing maybe used such as, but not limited to, spiral, hypoid, zerol and straight bevel gears as well as worm gears and chain drives as final drives and any type of friction drive. Hence, embodiments are not limited to just bevel gears. Moreover, there are a number of known arrangement for the side gears and pinions. Hence, embodiments are not limited in the arrangement of the side gears and pinions of the differential.

EXAMPLE EMBODIMENTS

Example 1 is a locking system for a differential. The locking system includes a locking collar, a ring gear and a side output gear. The locking collar has at least one locking tab that radially protrudes from an inner pilot diameter surface of a collar portion of the locking collar. The ring gear has at least one ring gear slot. The at least one ring gear slot is configured to receive the at least one locking tab of the locking collar. The ring gear has an opening section in the at least one ring gear slot. The side output gear has at least one side gear slot. The side output gear is positioned such that the at least one side gear slot can be accessed through the opening section of the at least one ring gear slot of the at least one ring gear. The at least one locking tab of the locking collar in the at least one ring gear slot is selectively received within the at least one side output gear slot to selectively place the differential in a locking configuration.

Example 2, includes the locking system for a differential of Example 1, wherein the ring gear further has an outer pilot diameter surface configured to slidably engage the inner pilot diameter surface of the locking collar.

Example 3 includes the locking system for a differential of any of the Examples 1-2, wherein the ring gear further includes a ring gear base and a gear portion selectively coupled to the ring gear base via at least one fastener.

Example 4 includes the locking system for a differential of any of the Examples 1-3, wherein in the locking collar further includes an outer perimeter manipulation feature.

Example 5 includes the locking system for a differential of any of the Examples 1-4, further including a lock fork. At least a portion of the lock fork is engaged in the outer perimeter manipulation feature of the locking collar.

Example 6 includes the locking system for a differential of any of the Examples 1-5, wherein the lock fork includes at least one pivot post pivotally nested in a housing and an activation tab configured to be engaged when manipulating the lock fork to selectively move the at least one locking tab of the locking collar within the at least one ring gear slot of the ring gear to selectively engage and unengaged the at least one locking tab of the locking collar in the at least one side gear slot of the side output gear through the opening section of the at least one ring gear slot of the at least one ring gear.

Example 7 includes the locking system for a differential of any of the Examples 1-6, wherein the lock fork further includes a generally U-shaped fork body having a pair of terminal ends, a fork tab extending inward from the fork body proximate each terminal end, a pair of pivot posts opposably extending out from the fork body and an activation tap extending outward from the fork body in a location between the pair of pivot posts. Each fork tab is engaged within the outer perimeter manipulation feature of the locking collar.

Example 8 includes the locking system for a differential of any of the Examples 1-7, wherein the side output gear further includes a side gear journal, splines and side gear teeth. The side gear journal is configured to engage at least a portion of a ring gear central passage of the ring gear. The splines are positioned within a side gear central passage.

Example 9 includes the locking system for a differential of any of the examples 1-8 wherein the ring further includes a gear portion and a carrier portion. The gear portion includes a gear side. The carrier portion is formed from at least one piece. The gear side of the gear portion is positioned in one of a position that faces the carrier portion of the ring gear and a position that faces away from the carrier portion of the ring gear.

Example 10 includes a differential including a housing, a torque receiving assembly, a ring gear assembly, a differential pinion assembly, a first side output gear, a second side output gear and a locking system. The housing has an input passage, a first output passage and second output passage. The torque receiving assembly is received at least in part within the input passage of the housing. The ring gear assembly is received within the housing. The ring gear assembly is in rotational communication with the torque receiving assembly. The differential pinion assembly is also received within the housing. The differential pinion assembly is in rotational communication with the ring gear assembly. The differential pinion assembly includes a first pinion gear and a second pinion gear. The second pinion gear is configured and arranged to rotate independently from the first pinion gear. The first side output gear is received within the housing. The first side output gear is in rotational communication with the first and second differential pinion gear. The first output passage of the housing proving access to the first side output gear. The second side output gear is further received within the housing. The second side output gear is in rotational communication with the first and second differential pinion gear. The second output passage of the housing provides access to the second side output gear. The locking system includes a locking collar. The locking collar has at least one locking tab that radially protrudes from an inner pilot diameter surface of a collar portion of the locking collar in an inverted star orientation. The ring gear has at least one ring gear slot. The at least one ring gear slot is configured to receive the at least one locking tab of the locking collar. The ring gear further has an opening section in the at least one ring gear slot. The first side output gear has at least one side gear slot. The first side output gear is positioned such that the at least one side gear slot can be accessed through the opening section of the at least one ring gear slot of the ring gear. The at least one locking tab of the locking collar in the at least one ring gear slot is selectively received within the at least one side gear slot to place the differential in a locking configuration.

Example 11 includes the differential of Example 10, further including an actuator configured an arranged to selectively move the at least one locking tab of the locking ring within the at least one ring gear slot of the ring gear.

Example 12 includes the differential of any of the Examples 10-11, further including a lock fork. At least a portion of the lock fork is engaged in an outer perimeter manipulation feature of the locking collar.

Example 13 includes the differential of any of the Examples 10-12, wherein the lock fork includes at least one pivot post that is pivotally coupled to the housing and an activation tab that is configured to be engaged when manipulating the lock fork to selectively move the at least one locking tab of the locking collar within the at least one ring gear slot of the ring gear to selectively engage and unengaged the at least one locking tab of the locking collar in the at least one side gear slot of the first side output gear through the opening section of the at least one ring gear slot of the at least one ring gear.

Example 14 includes the differential of any of the Examples 10-13, wherein the lock fork further includes a generally U-shaped fork body having a pair of terminal ends, a fork tab extending inward from the fork body proximate each terminal end, a pair of pivot posts opposably extending out from the fork body and an activation tab extending outward from the fork body in a location between the pair of pivot posts. Each fork tab is engaged within the outer perimeter manipulation feature of the locking collar. Each pivot post is received within a pivot seat in the housing. The activation tab configured and arranged to be engaged by an actuator.

Example 15 includes the differential of any of the Examples 10-14, wherein the side output gear further includes a side journal, splines and side gear engaging teeth. The side gear journal is configured to engage at least a portion of a ring gear central passage of the ring gear. The splines are positioned within a side gear central passage.

Example 16 includes a vehicle including a motor, a transmission, at least one drive shaft, at least one differential a first drive axle and a second drive axle. The motor provide a motor torque. The transmission is configured and arranged to receive the motor torque from the motor. The transmission is configured and arranged to applying select gear ratios to the received motor torque from the motor to generate a desired transmission output torque. The least one drive shaft is coupled to receive the transmission output torque. The least one differential, includes a torque receiving assembly, a ring gear, a differential pinion assembly, a first side output gear, a second output gear, a locking system, a first drive axle and a second drive axle. The torque receiving assembly is in rotational communication with the at least one drive shaft. The ring gear is in rotational communication with the torque receiving assembly. The differential pinion assembly is in rotational communication with the ring gear. The differential pinion assembly includes a first pinion gear and a second pinion gear. The second pinion gear is configured and arranged to rotate independently from the first pinion gear. The first side output gear is in rotational communication with the first and second pinion gears. The second side output gear is also in rotational communication with the first and second pinion gears. The locking system includes a locking collar. The locking collar has at least one locking tab that radially protrudes from an inner pilot diameter surface of a collar portion of the locking collar in an inverted star orientation. The ring gear has at least one ring gear slot. The at least one ring gear slot is configured to receive the at least one locking tab of the locking collar. The ring gear has an opening section in the at least one ring gear slot. The first side output gear has at least one side gear slot. The first side output gear is positioned such that the at least one side gear slot can be accessed through the opening section of the at least one ring gear slot of the at least one ring gear. The at least one locking tab of the locking collar in the at least one ring gear slot is selectively received within the at least one side gear slot to place the differential in a locking configuration. The first drive axle is in rotational communication with the first side output gear. The first drive axle further configured to be coupled to a first wheel. The second drive axle in rotational communication with the second side output gear. The second drive axle further configured to be coupled to a second wheel.

Example 17 includes the vehicle of Example 16, further including a lock fork. At least a portion of the lock fork is engaged in an outer perimeter manipulation feature of the locking collar.

Example 18 includes the vehicle of any of the Examples 16-17, wherein the lock fork includes at least one pivot post pivotally nested in a housing and an activation tab configured to be engaged when manipulating the lock fork to selectively move the at least one locking tab of the locking collar within the at least one ring gear slot of the ring gear to selectively engage and unengaged the at least one locking tab of the locking collar in the at least one side gear slot of the first side output gear through the opening section of the at least one ring gear slot of the at least one ring gear.

Example 19 includes the vehicle of any of the Examples 16-18, wherein the lock fork further includes a generally U-shaped fork body having a pair of terminal ends, a fork tab extending inward from the fork body proximate each terminal end, a pair of pivot posts opposably extending out from the fork body and an activation tab extending outward from the fork body in a location between the pair of pivot posts, the activation tab configured and arranged to be engaged by an actuator. Each fork tab is engaged within the outer perimeter manipulation feature of the locking collar. Each pivot post is received within a pivot seat in a housing.

Example 20 includes the vehicle of any of the Examples 16-19, further including an actuator that is configured and arranged to selectively move the locking collar of the differential to selectively lock and unlock the differential.

Example 21 includes the vehicle of any of the Examples 16-20, wherein the ring gear of the differential further has an outer pilot diameter surface configured to slidably engage an inner pilot diameter surface of the locking collar.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A locking system for a differential comprising:
   a locking collar having at least one locking tab that radially protrudes from an inner pilot diameter surface of a collar portion of the locking collar;
   a ring gear having at least one ring gear slot, the at least one ring gear slot configured to receive the at least one locking tab of the locking collar, the ring gear having an opening section in the at least one ring gear slot; and
   a side output gear including a radially extending outer rim, the side output gear having at least one side gear slot radially receding in the outer rim of the side output gear, the side output gear positioned such that the at least one side gear slot can be accessed through the opening section of the at least one ring gear slot of the at least one ring gear, the at least one locking tab of the locking collar in the at least one ring gear slot selectively received within the at least one side output gear slot to selectively place the differential in a locking configuration.

2. The locking system for a differential of claim 1, wherein the ring gear further has an outer pilot diameter surface configured to slidably engage the inner pilot diameter surface of the locking collar.

3. The locking system for a differential of claim 1, wherein the ring gear further comprises:
   a ring gear base; and
   a gear portion.

4. The locking system for a differential of claim 1, wherein the locking collar further includes an outer perimeter manipulation feature.

5. The locking system for a differential of claim 4, further comprising:
   a lock fork, at least a portion of the lock fork engaged with the outer perimeter manipulation feature of the locking collar.

6. The locking system for a differential of claim 5, wherein the lock fork including at least one pivot post pivotally nested in a housing and an activation tab configured to be engaged when manipulating the lock fork to selectively move the at least one locking tab of the locking collar within the at least one ring gear slot of the ring gear to selectively engage and unengaged the at least one locking tab of the locking collar in the at least one side gear slot of the side output gear through the opening section of the at least one ring gear slot of the at least one ring gear.

7. The locking system for a differential of claim 5, wherein the lock fork further comprising:
   a generally U-shaped fork body having a pair of terminal ends;
   a fork tab extending inward from the fork body proximate each terminal end, each fork tab engaged within the outer perimeter manipulation feature of the locking collar;
   a pair of pivot posts opposably extending out from the fork body; and
   an activation tab extending outward from the fork body in a location between the pair of pivot posts.

8. The locking system for a differential of claim 1, wherein the side output gear further comprises:
   a side gear journal configured to engage at least a portion of a ring gear central passage of the ring gear;
   splines positioned within a side gear central passage; and
   side gear engaging teeth.

9. The locking system for a differential of claim 1, further wherein the ring gear further comprises:
   a gear portion, the gear portion including a gear side; and
   a carrier portion formed from at least one piece, the gear side of the gear portion being positioned in one of a position that faces the carrier portion of the ring gear and a positioned that faces away from the carrier portion of the ring gear.

10. A differential comprising:
    a housing having an input passage, a first output passage and second output passage;
    a torque receiving assembly received at least in part within the input passage of the housing;
    a ring gear assembly received within the housing, the ring gear assembly in rotational communication with the torque receiving assembly;
    a differential pinion assembly received within the housing, the differential pinion assembly being in rotational communication with the ring gear assembly, the differential pinion assembly including,
      a first pinion gear, and
      a second pinion gear, the second pinion gear configured and arranged to rotate independently from the first pinion gear,
    a first side output gear received within the housing, the first side output gear in rotational communication with the first and second pinion gear, the first output passage of the housing proving access to the first side output gear;
    a second side output gear received within the housing, the second side output gear in rotational communication with the first and second pinion gear, the second output passage of the housing proving access to the second side output gear; and
    a locking system including,
      a locking collar having at least one locking tab that radially protrudes from an inner pilot diameter surface of a collar portion of the locking collar in an inverted star orientation,
      the ring gear having at least one ring gear slot, the at least one ring gear slot configured to receive the at least one locking tab of the locking collar, the ring gear having an opening section in the at least one ring gear slot, and
      the first side output gear including a radially extending outer rim, the first side output gear having at least one side gear slot radially receding in the outer rim of the first side output gear, the first side output gear positioned such that the at least one side gear slot can be accessed through the opening section of the at least one ring gear slot of the ring gear, the at least one locking tab of the locking collar in the at least one ring gear slot selectively received within the at least one side gear slot to place the differential in a locking configuration.

11. The differential of claim 10, further comprising:
    an actuator configured an arranged to selectively move the at least one locking tab of the locking collar within the at least one ring gear slot of the ring gear.

12. The differential of claim 10, further comprising:
    a lock fork, at least a portion of the lock fork engaged with an outer perimeter manipulation feature of the locking collar.

13. The differential of claim 12, wherein the lock fork including at least one pivot post pivotally coupled to the housing and an activation tab configured to be engaged when manipulating the lock fork to selectively move the at least one locking tab of the locking collar within the at least one ring gear slot of the ring gear to selectively engage and unengaged the at least one locking tab of the locking collar in the at least one side gear slot of the first side output gear through the opening section of the at least one ring gear slot of the at least one ring gear.

14. The differential of claim 13, wherein the lock fork further comprising:
    a generally U-shaped fork body having a pair of terminal ends;
    a fork tab extending inward from the fork body proximate each terminal end, each fork tab engaged within the outer perimeter manipulation feature of the locking collar;
    a pair of pivot posts opposably extending out from the fork body, each pivot post received within a pivot seat in the housing; and
    an activation tab extending outward from the fork body in a location between the pair of pivot posts, the activation tab configured and arranged to be engaged by an actuator.

15. The differential of claim 10, wherein the side output gear further comprises:
    a side gear journal configured to engage at least a portion of a ring gear central passage of the ring gear;
    splines positioned within a side gear central passage; and
    side gear engaging teeth.

16. A vehicle comprising:
    a motor to provide motor torque;
    a transmission configured and arranged to receive the motor torque from the motor, the transmission configured and arranged to applying select gear ratios to the received motor torque from the motor to generate a desired transmission output torque;
    at least one drive shaft coupled to receive the transmission output torque;
    at least one differential, the at least one differential including,
      a torque receiving assembly in rotational communication the at least one drive shaft,
      a ring gear in rotational communication with the torque receiving assembly, and
      a differential pinion assembly being in rotational communication with the ring gear, the differential pinion assembly including,
        a first pinion gear, and a second pinion gear, the second pinion gear configured and arranged to rotate independently from the first pinion gear, a first side output gear in rotational communication with the first and second pinion gears, a second side output gear in rotational communication with the first and second pinion gears, a locking system including, a locking collar having at least one locking tab that radially protrudes from an inner pilot diameter surface of a collar portion of the locking collar in an inverted star orientation, the ring gear having at least one ring gear slot, the at least one ring gear slot configured to receive the at least one locking tab of the locking collar, the ring gear having an opening section in the at least one ring gear slot, and the first side output gear including a radially extending outer rim, the first side output gear having at least one side gear slot radially receding in the outer rim of the first side output gear, the first side output gear positioned such that the at least one side gear slot can be accessed through the opening section of the at least one ring gear slot of the at least one ring gear, the at least one locking tab of the locking collar in the at least one ring gear slot selectively received within the at least one side gear slot to place the differential in a locking configuration;

a first drive axle in rotational communication with the first side output gear, the first drive axle further configured to be coupled to a first wheel; and a second drive axle in rotational communication with the second side output gear, the second drive axle further configured to be coupled to a second wheel.

17. The vehicle of claim 16, wherein the differential further comprises:

a lock fork, at least a portion of the lock fork engaged in an outer perimeter manipulation feature of the locking collar.

18. The vehicle of claim 16, wherein the lock fork includes at least one pivot post pivotally nested in a housing and an activation tab configured to be engaged when manipulating the lock fork to selectively move the at least one locking tab of the locking collar within the at least one ring gear slot of the ring gear to selectively engage and unengaged the at least one locking tab of the locking collar in the at least one side gear slot of the first side output gear through the opening section of the at least one ring gear slot of the at least one ring gear.

19. The differential of claim 18, wherein the lock fork further comprises:

a generally U-shaped fork body having a pair of terminal ends;

a fork tab extending inward from the fork body proximate each terminal end, each fork tab engaged within the outer perimeter manipulation feature of the locking collar;

a pair of pivot posts opposably extending out from the fork body, each pivot post received within a pivot seat in a housing; and an activation tab extending outward from the fork body in a location between the pair of pivot posts, the activation tab configured and arranged to be engaged by an actuator.

20. The vehicle of claim 16, further comprising:

an actuator configured and arranged to selectively move the locking collar of the differential to selectively lock and unlock the differential.

21. The vehicle of claim 16, wherein the ring gear of the differential further has an outer pilot diameter surface configured to slidably engage an inner pilot diameter surface of the locking collar.

* * * * *